(12) United States Patent
Yu et al.

(10) Patent No.: US 10,386,034 B2
(45) Date of Patent: Aug. 20, 2019

(54) ROTARY ELECTROMAGNETIC ACTUATOR AND CAR LAMP LOW BEAM AND HIGH BEAM LIGHT SWITCHING DEVICE

(71) Applicant: HASCO VISION TECHNOLOGY CO., LTD., Shanghai (CN)

(72) Inventors: Shijie Yu, Shanghai (CN); Minghua Zhu, Shanghai (CN); Tianzhong Guo, Shanghai (CN); Yujie Chen, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 114 days.

(21) Appl. No.: 15/402,742

(22) Filed: Jan. 10, 2017

(65) Prior Publication Data
US 2017/0114977 A1 Apr. 27, 2017

Related U.S. Application Data

(63) Continuation-in-part of application No. 14/425,984, filed on Mar. 4, 2015, now abandoned.

(51) Int. Cl.
| | |
|---|---|
| *F21S 41/689* | (2018.01) |
| *H02K 1/27* | (2006.01) |
| *F21V 14/08* | (2006.01) |
| *B60Q 1/14* | (2006.01) |

(52) U.S. Cl.
CPC .......... *F21S 41/689* (2018.01); *B60Q 1/1438* (2013.01); *F21V 14/08* (2013.01); *H02K 1/27* (2013.01); *H02K 1/2706* (2013.01)

(58) Field of Classification Search
CPC ........ H02K 15/03; H02K 1/27; H02K 1/2706; H02K 1/2713; H02K 1/272; H02K 1/2726; H02K 1/2733; B60Q 1/1438; F21S 41/689; F21S 41/698; F21S 41/40; F21S 41/47; F21V 14/08; F21V 14/085; F21W 2102/00; F21W 2102/10; F21W 2102/13;
(Continued)

(56) References Cited

U.S. PATENT DOCUMENTS

| | | | | |
|---|---|---|---|---|
| 4,438,362 A | * | 3/1984 | Brown | H01F 7/0205 310/152 |
| 6,020,666 A | * | 2/2000 | Nagahashi | H02K 23/04 310/154.28 |

(Continued)

FOREIGN PATENT DOCUMENTS

| | | | | |
|---|---|---|---|---|
| EP | 2442017 A1 | * | 4/2012 | ............ F21S 41/689 |
| JP | 2011239532 A | * | 11/2011 | ............ F21S 41/689 |

*Primary Examiner* — Erin Kryukova
(74) *Attorney, Agent, or Firm* — Gokalp Bayramoglu

(57) ABSTRACT

A rotary electromagnetic actuator for car lamp low beam and high beam light switching device, comprises a shell (401), a rotor (402), a stator (403), a rotating shaft (405) and an end cover (407). The stator is fixedly installed in the shell to form a pair of arc-shaped stator magnetic poles (409) on which electric excitation can be applied; the rotor, as an arc-shaped permanent magnet, is fixed on the rotating shaft and is located in a magnetic field space of the arc-shaped magnetic poles of the stator; and the rotor is matched with the arc-shaped stator magnetic poles to form a closed magnetic circuit with an air gap (410); two swing bars (406) are connected to two ends of the rotating shaft respectively.

6 Claims, 5 Drawing Sheets

(58) Field of Classification Search
CPC ......... F21W 2102/135; F21W 2102/14; F21W 2102/145; F21W 2102/15; F21W 2102/155
USPC .................................... 362/467, 512; 310/36
See application file for complete search history.

(56) References Cited

U.S. PATENT DOCUMENTS

| | | | | |
|---|---|---|---|---|
| 2009/0190368 A1* | 7/2009 | Smajser | ............... | F21S 41/689 |
| | | | | 362/539 |
| 2009/0244919 A1* | 10/2009 | Sirolla | .................. | F21S 41/698 |
| | | | | 362/512 |
| 2009/0322188 A1* | 12/2009 | Yamazaki | .............. | H02K 13/10 |
| | | | | 310/40 MM |
| 2013/0258433 A1* | 10/2013 | Rivier | ................... | F21S 41/689 |
| | | | | 359/230 |
| 2013/0258695 A1* | 10/2013 | Yamazaki | ............. | F21S 41/692 |
| | | | | 362/513 |

* cited by examiner

ROTARY ELECTROMAGNETIC ACTUATOR AND CAR LAMP LOW BEAM AND HIGH BEAM LIGHT SWITCHING DEVICE

CROSS REFERENCE TO THE RELATED APPLICATIONS

This application is a continuation-in-part application of U.S. patent application Ser. No. 14/425,984 that is the U.S. national phase of International Application No. PCT/CN2013/082970 Filed on 5 Sep. 2013 which designated the U.S. and claims priority to Chinese Application Nos. CN201210330728.1 filed on 7 Sep. 2012, the entire contents of each of which are hereby incorporated by reference.

TECHNICAL FIELD

The invention relates to a lighting device and component parts of such a system, in particular to a car lamp low beam and high beam light switching device and to a rotary electromagnetic actuator used for changing characteristics and distribution of light by means of adjusting parts of the device.

BACKGROUND

A driver often meets opposite vehicles when climbing or going down a slope in driving. Particularly, when a vehicle is driven at night-time, light of an opposite vehicle and the reflection light of the pavement in the course of climbing or going down the slope will influence the visual sense of the driver; in the event that the light is too strong, the driver cannot see the road in front clearly, so the driver is required to switch between the car lamp low beam and high beam light of the vehicle in a timely manner, otherwise a traffic accident will happen. Therefore, modern vehicles can achieve control of switching between a low beam and high beam light of the automobile, by broadly applying a switching mechanism for the headlamp; an electromagnetic actuator (solenoid valve) is widely applied to the switching mechanism of a headlamp. The headlamp switching can be realized by using the absorption and resilience of an electromagnet in the electromagnetic actuator (solenoid valve), and its action is relatively reliable.

The Chinese utility model "Improvement of car lamp low beam and high beam light switching device" (Patent number of utility model: ZL 200720129230.3; authorized announcement number: CN201089421Y) discloses an improvement of a car lamp low beam and high beam light switching device, wherein a fixed blade is arranged at the front edge of a reflection mirror body, and the adjusting device includes a solenoid valve and a moving blade; the solenoid valve is provided with a moving rod used for connecting with the moving blade, and the moving blade is connected with the fixed blade by a pivoting component, and used for taking the pivoting component as the rotating shaft; the moving blade is extended with a connecting arm perpendicular to the moving blade body, and used for connecting with the moving bar of the solenoid valve; the solenoid valve of the adjusting device is arranged at the side of the reflection mirror body, and the pivoting component is used as the rotating shaft of the moving blade, so that the power consumption of the solenoid valve can be reduced; it is good for reducing the heat energy of the solenoid valve, and reducing the degree of temperature rise.

The Chinese utility model "Improvement of low beam and high beam light switching device for the automotive headlamp" (Patent number of utility model: ZL200920073422.6; authorized announcement number: CN201462690U) discloses a low beam and high beam light switching device for an automotive headlamp, which is mainly composed of a fixed light screen, a moveable light screen, a rotating shaft, a rotating shaft spacing gasket, an electromagnetic iron member and a connecting linear member. The switching function component of the low beam and high beam light of the utility model is simple in structure, easy to produce and assemble, rapid in its switching reaction, and good in light screening; moreover, it can more efficiently and safely switch the low beam and high beam light, and improve the driving safety.

However, in practice, some users complain about a big collision noise during the actuation and release of the electromagnet in the prior art electromagnetic actuators. Because of the resulting environment of stress on a user's comfort level, it is very necessary to reduce noise when a rotary electromagnetic actuator is worked. Besides, the electromagnet will generate a strong shock during the actuation and release, and also easy to cause jittering of the light beam; moreover, this shock will cause loose connections and other failure, and influence the reliability of the low beam and high beam light switching device.

SUMMARY

The invention aims to provide a rotary electromagnetic actuator used for the car lamp low beam and high beam light switching device; by changing the movement form of the electromagnetic actuator, the technical problem of a big noise can be solved with the low beam and high beam light switching device according to the invention.

The technical plan adopted to solve the technical problem in this invention is:

A rotary electromagnetic actuator, comprising a shell, a rotor, a stator, a rotating shaft and an end cover, and used for driving a light screen of a car lamp low beam and high beam light switching device, characterized in that:

a stator winding is arranged on the stator, and the stator and the stator winding are fixedly mounted in the shell to form a pair of arc-shaped stator magnetic poles on which electric excitation can be applied;

the rotor, which is an arc-shaped permanent magnet with a central angle up to that of a semicircle, is fixed on the rotating shaft and is located in the up to semicircular magnetic field space formed by the arc-shaped magnetic poles of the stator; and the rotor is matched with the arc-shaped stator magnetic poles to form a closed magnetic circuit with an air gap;

a swing bar extending along a radial direction of the rotating shaft connected to each of two ends of the rotating shaft respectively; the light screen of the car lamp low beam and high beam light switching device is fixedly connected on the swing bars disposed at the two ends of the rotating shaft; and a swing angle of the light screen is identical with a rotating angle of the rotor.

A good technical embodiment of the rotary electromagnetic actuator of the invention is characterized in that the rotor of the electromagnetic actuator is rotatably fixed in the magnetic field space of the arc-shaped magnetic poles of the stator through a shaft hole on the end cover; whereby, under an uncharged state, the rotor stops on an initial position where the permanent magnet is opposite to one of the magnetic poles of the stator; and under a charged state, the rotor rotates to an acting position, where the permanent magnet is opposite to the pair of the magnetic poles of the stator under the function of a magnetic field generated by the stator winding.

A better technical embodiment of the rotary electromagnetic actuator of the invention is characterized in that the permanent magnet of the rotor is integrated with the rotating shaft and the swing bars through injection moulding.

Another one purpose of the invention is to provide a car lamp low beam and high beam light switching device using the rotary electromagnetic actuator; through changing the movement form of the electromagnetic actuator, the movement method of the whole car lamp low beam and high beam light switching device is changed, thereby the technical problem of big noise can be solved when the car lamp low beam and high beam light switching device.

The technical plan adopted to solve the technical problem of the invention is:

A car lamp low beam and high beam light switching device, comprising a light screen, a electromagnetic actuator, and a bracket fixed on the lamp body, wherein:

the electromagnetic actuator is the rotary electromagnetic actuator according to the present invention as described herein; each end of the rotating shaft of the electromagnetic actuator is respectively connected with one swing bar extended along the radial direction of the rotating shaft;

the rotary electromagnetic actuator is fixedly connected to the bracket through the shell, and connected to the lamp body through the bracket;

the light screen is fixedly connected to the swing bar, and placed on the light axial line of the lamp associated with the car lamp low beam and high beam light switching device; an included angle between the light screen and the light axial line can be changed along with the rotating angle of the rotor; an outline of the light screen is projected on the road to form a light model of the low beam and high beam light, the light model being changed along with the rotation of the rotor between the low beam and high beam light model.

A good technical embodiment of the car lamp low beam and high beam light switching device is characterized in that the light screen is welded with the rotating shaft and the swing bars into one.

A better technical embodiment of the car lamp low beam and high beam light switching device of the invention is characterized by comprising a scroll spring and a spring component comprising a spring frame; the spring component is fixed on the bracket through the spring frame, a free end of the scroll spring is connected to the light screen; whereby, under an uncharged state, the rotor is returned and kept at the initial position under the action of the scroll spring through the transmission of the swing bar and the rotating shaft.

Beneficial effects of this invention are:

1. The rotary electromagnetic actuator and the car lamp low beam and high beam light switching device, provided by the invention, can realize the car lamp low beam and high beam light switching through the method of driving the light screen by the rotary electromagnetic actuator, avoiding a big collision noise generated by the actuation and release of the electromagnet, and providing a more comfortable driving environment for users;

2. The rotary electromagnetic actuator and the car lamp low beam and high beam light switching device, provided by the invention, drive the light screen by use of the rotary electromagnetic actuator, avoiding jittering of the light beam caused by shocks in the course of actuation and release of the electromagnet, and loose connections caused by this shock, thereby improving the service life and reliability of the car lamp low beam and high beam light switching device of the rotary electromagnetic actuator;

3. The rotary electromagnetic actuator and the car lamp low beam and high beam light switching device, provided by the invention, realize the car lamp low beam and high beam light switching by using a rotary electromagnetic actuator to replace the electromagnet; this provides a bigger adjusting range of the light screen, and can avoid a light screening phenomenon of the light screen at a place closing to the pivoting point; therefore, it can enlarge the light beam adjusting range by reason of not increasing the boundary dimension of the electromagnetic actuator, thereby reducing the size of the internal space required by the lamp in the car lamp low beam and high beam light switching device.

The signs of every part in the figures above are: 1—lamp body (reflection mirror), 2—light screen, 3—spring component, 301—scroll spring, 302—spring frame, 4—electromagnetic actuator, 5—bracket, 401—shell, 402—rotor (permanent magnet), 403—stator, 404—stator winding, 405—rotating shaft, 406—swing bar, 407—end cover, 408—shaft hole, 409—pair of arc-shaped stator magnetic poles, 410—air gap, 411—ends of the rotating shaft.

DETAILED DESCRIPTION OF THE EMBODIMENTS

In order to better understand the technical plan of the invention, the following will further describe in details by referring to the attached drawings and embodiments.

Figure 2:
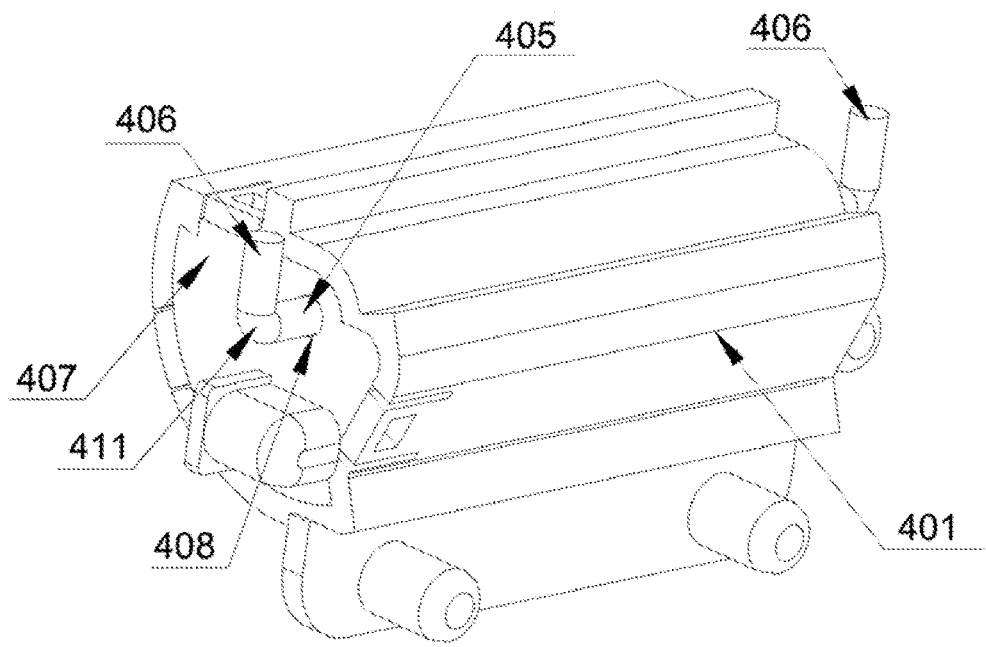
FIG. 2 is an external structure diagram of the rotary electromagnetic actuator of the invention.
Figure 3:
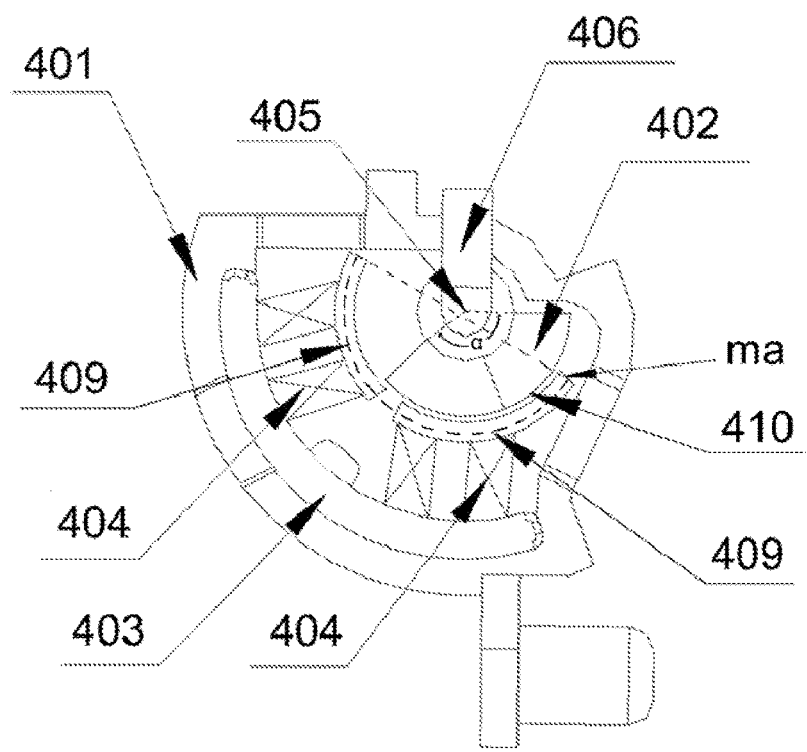
FIG. 3 is an internal structure diagram of the rotary electromagnetic actuator of the invention.
Figure 4:
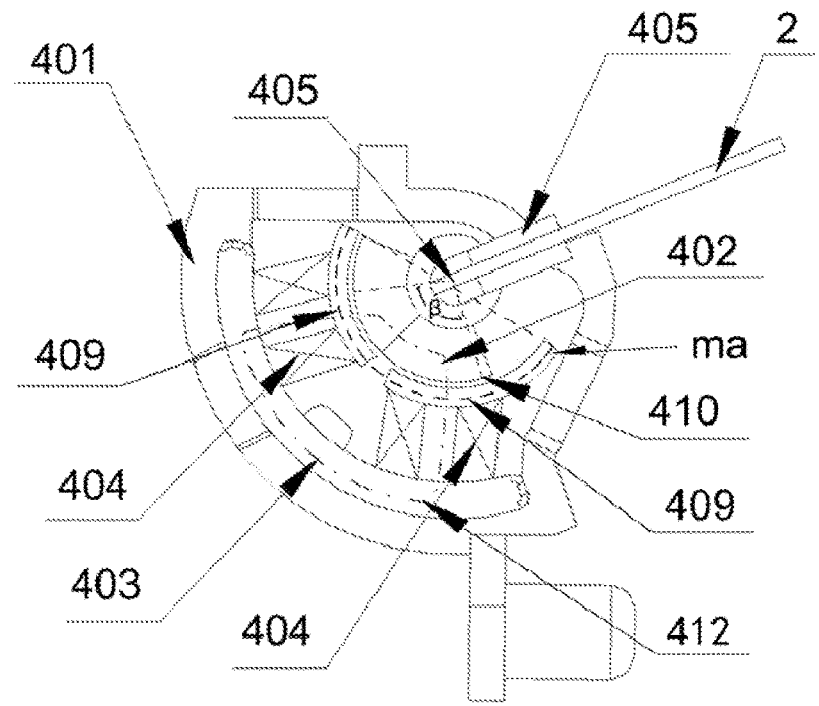
FIG. 4 is a structural representation showing how the rotary electromagnetic actuator of the invention drives the light screen to rotate it to the action position.

One embodiment of the rotary electromagnetic actuator of the invention is shown as FIG. 2 and FIG. 3; FIG. 4 is a structural representation showing how the rotary electromagnetic actuator of the invention drives the light screen to rotate it to the action position. In the embodiment of the rotary electromagnetic actuator shown in the attached drawings, the actuator includes a shell 401, a rotor, 402, a stator 403, a rotating shaft 405, an end cover 407, and a light screen 2 used for driving the car lamp low beam and high beam light switching device. In order to more clearly express the internal structure of the rotary electromagnetic actuator 4 of the invention, the end cover 407 is omitted in FIG. 3 and FIG. 4.

A stator winding 404 is arranged on the stator 403, and the stator 403 and the stator winding 404 are fixedly mounted in the shell to form a pair of arc-shaped stator magnetic poles 409 on which electric excitation can be applied.

The rotor 402, the rotor, which is an arc-shaped permanent magnet with a central angle α being less than that of a semicircle, is fixed on the rotating shaft 405 and is located in a semicircular magnetic field space ma formed by the arc-shaped magnetic poles of the stator; and the rotor 402 is matched with the arc-shaped stator magnetic poles to form a closed magnetic circuit 412 with an air gap 410.

A swing bar 406 extending along a radial direction of the rotating shaft 405 is connected to each of the two ends 411 of the rotating shaft respectively; the light screen of the car lamp low beam and high beam light switching device is fixedly connected on the swing bars 406 disposed at the two ends of the rotating shaft; and a swing angle β' of the light screen 2 is identical with a rotating angle β of the rotor 402.

According to the embodiment of the rotary electromagnetic actuator of the invention shown in FIG. 2, FIG. 3 and FIG. 4, the rotor 402 of the electromagnetic actuator 4 is rotatably fixed in the magnetic field space of the arc-shaped magnetic poles of the stator 403 through a shaft hole 408 on the end cover 407; under an uncharged state, the rotor stops on an initial position where the permanent magnet is opposite to one of the magnetic poles of the stator, as shown in FIG. 3; and under a charged state, the rotor rotates to an acting position where the permanent magnet is opposite to the pair of the magnetic poles of the stator under the function of a magnetic field generated by the stator winding, as shown in FIG. 4.

According to a better embodiment of the rotary electromagnetic actuator of the invention, the permanent magnet of the rotor 402 is integrally injection-molded with the rotating shaft 405 and the swing bars 406.

Figure 1:
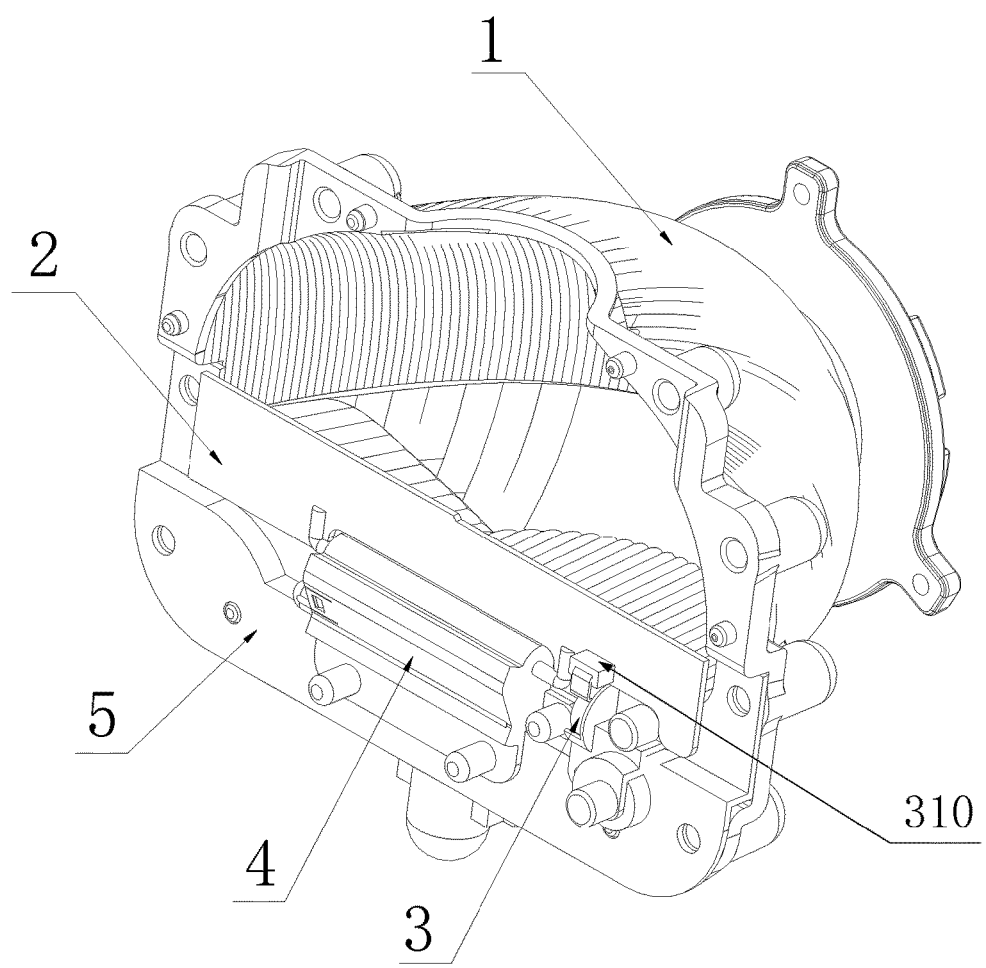
FIG. 1 is a structural representation of the car lamp low beam and high beam light switching device adopting the rotary electromagnetic actuator of the invention.
Figure 5:
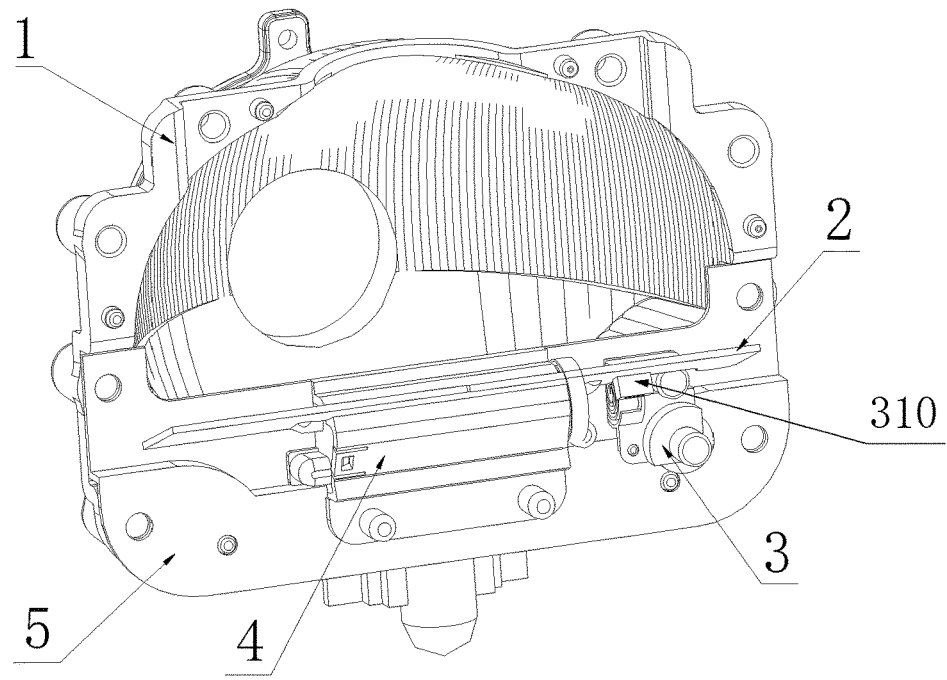
FIG. 5 is a schematic diagram of a car lamp low beam and high beam light switching device in which the light screen is rotated to the action position.
Figure 6:
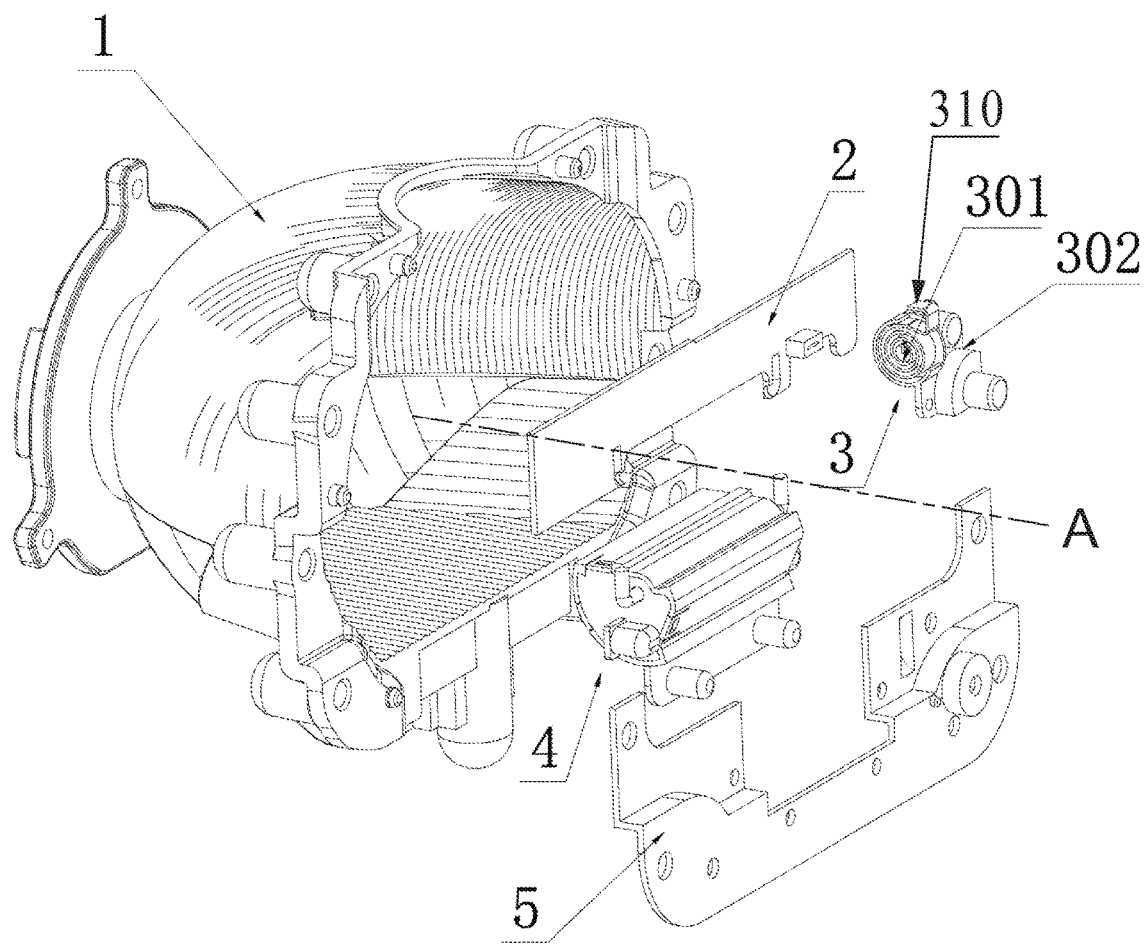
FIG. 6 is an exploded schematic diagram of the assembling relationship of the parts of the car lamp low beam and high beam light switching device of the invention.
Figure 7:
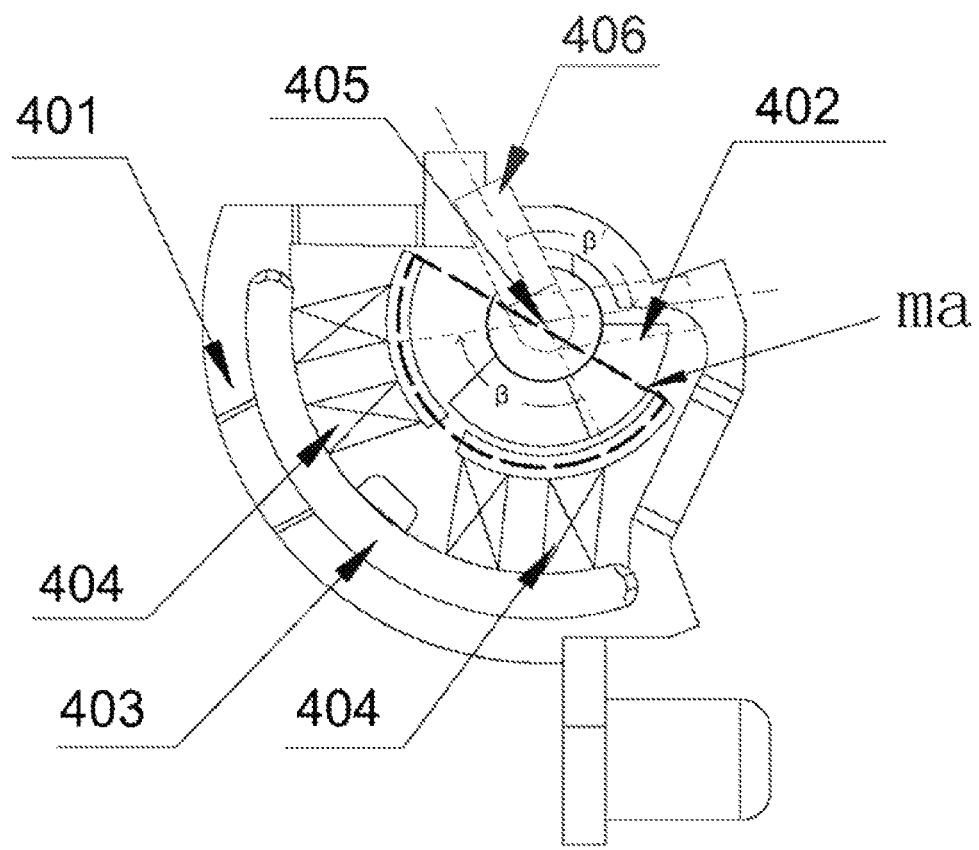
FIG. 7 is an internal structure diagram of the rotary electromagnetic actuator of the invention showing the swing angle β' of the light screen and the rotating angle β of the rotor.

FIG. 1, FIG. 5 and FIG. 6 represent one embodiment of the car lamp low beam and high beam light switching device adopting the rotary electromagnetic actuator of the invention; it comprises a light screen 3, an electromagnetic actuator 4 and a bracket 5 fixed on the lamp body 1. The lamp body is generally combined with a reflection mirror, so it is also described as a reflection mirror. The electromagnetic actuator 4 is a rotary electromagnetic actuator according to the invention, and each end 411 of the rotating shaft 405 of the rotary electromagnetic actuator 4 is respectively connected with one swing bar 406 extending along the radial direction of the rotating shaft. The electromagnetic actuator 4 is fixed on the bracket 5 through the shell 401, and connected to the lamp body 1 through the bracket 5.

The light screen 2 is fixedly connected to the swing bar 406, and placed on the light axial line A of the lamp; an included angle between the light screen 2 and the light axial line can be changed along with the rotating angle of the rotor 402; an outline of the light screen is projected on the road to form a light model of the low beam and high beam light, the light model being changed along with the rotation of the rotor 402.

According to one embodiment of the car lamp low beam and high beam light switching device of the invention, the light screen 2 is welded with the rotating shaft 405 and the swing bars 406 into one.

According to a preferable embodiment of the car lamp low beam and high beam light switching device of the invention, the car lamp low beam and high beam light switching device further comprises a scroll spring 301 and a spring component 3 comprising a spring frame 302; the spring component 3 is fixed on the bracket through the spring frame 302, a free end 310 of the scroll spring 301 is connected to the light screen 2; whereby, under an uncharged state, the rotor is returned and kept at the initial position under the action of the scroll spring 301 through the transmission of the swing bar 406 and the rotating shaft 405.

What is claimed is:

1. A car lamp low beam and high beam light switching device, comprising: a light screen, a rotary electromagnetic actuator, and a bracket fixed on a lamp body;

wherein the rotary electromagnetic actuator comprises a shell, a rotor, a stator, a rotating shaft and an end cover; the rotary electromagnetic actuator is configured for driving the light screen of the car lamp low beam and high beam light switching device;

a stator winding is arranged on the stator; the stator and the stator winding are fixedly mounted in the shell to form a pair of arc-shaped stator magnetic poles, the arc-shaped magnetic poles form a semicircular magnetic field space;

the rotor is a fan-shaped permanent magnet with a central angle being less than that of a semi-circle, and is fixed on the rotating shaft and is located in the semicircular magnetic field space; the rotor is matched with the arc-shaped stator magnetic poles to form a closed magnetic circuit with an air gap; wherein, the rotor is disposed between the stator and the rotating shaft;

two swing bars extending along a radial direction of the rotating shaft connected to each of two ends of the rotating shaft respectively;

the light screen of the car lamp low beam and high beam light switching device is fixedly connected on the swing bars disposed at the two ends of the rotating shaft; and a swing angle of the light screen is identical with a rotating angle of the rotor;

each of the ends of the rotating shaft of the electromagnetic actuator is respectively connected with one swing bar extending along the radial direction of the rotating shaft;

the rotary electromagnetic actuator is fixedly connected to the bracket through the shell, and connected to the lamp body through the bracket;

the light screen is placed on a light axial line of a lamp associated with the car lamp low beam and high beam light switching device; an included angle between the light screen and the light axial line can be changed along with the rotating angle of the rotor; an outline of the light screen is projected on a road to form a light model of a low beam and high beam light, the light model being changed along with the rotation of the rotor between a low beam model and a high beam light model.

2. The car lamp low beam and high beam light switching device according to claim 1, wherein the light screen is welded with the rotating shaft and the swing bars into one.

3. The car lamp low beam and high beam light switching device according to claim 1, further comprising a scroll spring and a spring component comprising a spring frame; the spring component is fixed on the bracket through the spring frame, a free end of the scroll spring is connected to the light screen; whereby, under an uncharged state, the rotor is returned and kept at the initial position under an action of the scroll spring through a transmission of the swing bar and the rotating shaft 4.

4. The car lamp low beam and high beam light switching device according to claim 1, wherein the rotor of the electromagnetic actuator is rotatably fixed in the magnetic field space of the arc-shaped magnetic poles of the stator through a shaft hole on the end cover; whereby, under an uncharged state, the rotor stops on an initial position where the permanent magnet is opposite to one of the magnetic poles of the stator; and under a charged state, the rotor rotates to an acting position where the permanent magnet is opposite to the pair of the magnetic poles of the stator under the function of a magnetic field generated by the stator winding (404).

5. The car lamp low beam and high beam light switching device according to claim 1, wherein the permanent magnet of the rotor is integrally injection-molded with the rotating shaft and the swing bars.

6. A car lamp low beam and high beam light switching device, consisting of: a light screen, a rotary electromagnetic actuator, and a bracket fixed on a lamp body;

wherein the rotary electromagnetic actuator comprises a shell, a rotor, a stator, a rotating shaft and an end cover; the rotary electromagnetic actuator is configured for driving the light screen of the car lamp low beam and high beam light switching device;

a stator winding is arranged on the stator; the stator and the stator winding are fixedly mounted in the shell to form a pair of arc-shaped stator magnetic poles, the arc-shaped magnetic poles form a semicircular magnetic field space;

the rotor is a fan-shaped permanent magnet with a central angle being less than that of a semi-circle, and is fixed on the rotating shaft and is located in the semicircular magnetic field space; the rotor is matched with the arc-shaped stator magnetic poles to form a closed magnetic circuit with an air gap; wherein, the rotor is disposed between the stator and the rotating shaft;

two swing bars extending along a radial direction of the rotating shaft connected to each of two ends of the rotating shaft respectively;

the light screen of the car lamp low beam and high beam light switching device is fixedly connected on the swing bars disposed at the two ends of the rotating shaft;

and a swing angle of the light screen is identical with a rotating angle of the rotor;

each of the ends of the rotating shaft of the electromagnetic actuator is respectively connected with one swing bar extending along the radial direction of the rotating shaft;

the rotary electromagnetic actuator is fixedly connected to the bracket through the shell, and connected to the lamp body through the bracket;

the light screen is placed on a light axial line of a lamp associated with the car lamp low beam and high beam light switching device; an included angle between the light screen and the light axial line can be changed along with the rotating angle of the rotor; an outline of the light screen is projected on a road to form a light model of a low beam and high beam light, the light model being changed along with the rotation of the rotor between a low beam model and a high beam light model.

\* \* \* \* \*